United States Patent [19]
Okazaki et al.

[11] 3,873,406
[45] Mar. 25, 1975

[54] SYNTHETIC LEATHER AND METHOD OF PREPARING THE SAME

[75] Inventors: Kaoru Okazaki; Akira Higuchi; Naoki Imaeda, all of Otsu, Japan

[73] Assignee: Toray Industries, Inc., Tokyo, Japan

[22] Filed: Dec. 6, 1973

[21] Appl. No.: 422,583

[30] Foreign Application Priority Data
Dec. 22, 1972 Japan.............................. 47-128114
Feb. 22, 1973 Japan.............................. 48-20708

[52] U.S. Cl................. 161/159, 156/235, 156/237, 156/238, 161/160, 161/165, 161/DIG. 2
[51] Int. Cl.......................... B32b 3/00, B32b 27/12
[58] Field of Search.................... 156/235, 237, 238; 161/159, 160, DIG. 2, 165

[56] References Cited
UNITED STATES PATENTS
3,632,417   1/1972   Brasen .............................. 161/159
3,650,880   3/1972   Tieniber............................ 161/159

Primary Examiner—William J. Van Balen

[57] ABSTRACT

Synthetic leather consists, as a sectional structure, of a porous coating layer and a fibrous sheet layer which consists of a boundary layer containing the same polymer that is in the porous coating layer and a fibrous substrate containing a polymeric binder.

The leather is produced by contacting a layer of a polymer composition obtained by applying a polymer composition to the surface of a release support on a fibrous sheet material treated with a mixed solution which consists of about 35–10 percent by weight of a non-solvent and about 65–90 percent by weight of a solvent for the polymer composition and for the polymer in the following polymeric binder, adhering with pressure the resultant contacted layer and material at a uniting clearance shown by the expression:

$$0.5 \leq \frac{\text{Uniting clearance}}{X + Y} < 1.0$$

(wherein X is the thickness of the layer of polymer composition and Y is the thickness of the fibrous sheet material), coagulating the polymer composition in the contacted layer and material, and thereafter introducing the polymeric binder into the fibrous sheet material.

34 Claims, 3 Drawing Figures

SYNTHETIC LEATHER AND METHOD OF PREPARING THE SAME

DETAILED DESCRIPTION OF THE INVENTION

This invention relates to improved synthetic leather and a method of preparing the same.

Heretofore, various proposals have been made with reference to the use of composites as synthetic leather, and to methods of preparing the same. However, at present composites have come into a variety of uses, and the number of characteristics and properties required of such composites has become large. Accordingly, there have been no proposals for synthetic leathers which satisfy all of these requirements at the same time. Further, there have been no proposals for methods of efficiently preparing such leather.

In the next few paragraphs, many desirable properties and characteristics of leather according to this invention will be discussed, and a few representative existing and conventional methods will be reviewed.

1. A method is known which comprises immersing a non-woven, knitted or woven fabric (hereinafter referred to as fibrous sheet material) in a polymer impregnating composition, thereafter coagulating and drying the product to prepare a fibrous substrate, separately preparing a coating layer from a polymer composition, and adhering the coating layer to the fibrous substrate with an adhesive. This is hereinafter referred to as the "adhering" method.

2. Another known method comprises immersing a fibrous sheet material in a polymer impregnating composition, directly applying a polymer composition onto the material and thereafter coagulating the thus impregnated fibrous sheet material and the polymer composition. This is hereinafter referred to as the "direct adhering" method.

3. Another method comprises immersing a fibrous sheet material in a polymer impregnating composition, wet-coagulating the impregnated fibrous sheet material and then drying the material to prepare a fibrous substrate, imparting to the substrate a single liquid which is a non-solvent for the polymer impregnating composition and for the polymer in the fibrous sheet material, separately and very thinly applying to a glass plate a polymer composition (containing a non-solvent for the polymer without fail), lapping the surface of this applied coating over the surface of the fibrous substrate which the aforementioned single liquid is on the surface of the substrate, stripping the overlapped coating and substrate off the glass plate and then wet-coagulating the same. This is hereinafter referred to as the "stripping method before coagulation."

In the "adhering" method, because the polymer coating is caused to adhere to the fibrous substrate by an adhesive agent, drawbacks exist such as (1) the water vapor permeability decreases sharply, which becomes a cause for accumulation of moisture around the foot leather product is used as an upper leather, and its basic properties as a material for shoes deteriorate, (2) the softness decreases, the conformability to the shape of the wearer's foot becomes poorer when such synthetic leather is used as an upper material, and the basic properties of the leather as a material for use in shoes also suffer, and (3) this method requires the two extra steps of coating an adhesive and coagulating the adhesive — which is disadvantageous from the viewpoint of industrial productivity.

In the direct adhering method, because the polymer composition is applied directly to the surface of the fibrous substrate, the smoothness of the applied surface lessens. Because of that, the surface unevenness further expands upon elongating the resulting synthetic leather, to reduce drastically the commercial value of the synthetic leather. There is a special treatment for making the surface smooth like the surface of a glass plate, but this treatment seriously affects various characteristics of flexibility, resistance, softness, water vapor permeability, repulsive elasticity and high degree processability. Accordingly, it is not possible to satisfy simultaneously the various property requirements that are required of a composite. Again, the aforementioned special treatment step is increased industrially, the operation becomes complicated and the productivity lowers. Further, the most significant drawback is that it is very difficult to control the quantity of the layer of the polymer composition to be introduced into the layer of the fibrous substrate, which makes the quality of the product unstable.

In the method involving stripping before coagulation, there are several drawbacks. It is essential that a non-solvent for the polymer must be present in the composition of said polymer. Because of that, the disadvantage arises that the viscosity of the polymer composition becomes unstable, the dispersed condition of various combination components blended in the polymer composition is worse, and the physical properties of the coating obtained and the condition of the boundary between the coating layer and the layer of fibrous substrate grow worse; because the fibrous substrate is treated with a single solution of a non-solvent for the polymer only, the layer of polymer composition is thereafter lapped over it and wet-coagulated, the adhesive strength between the coating layer and the layer of fibrous substrate weakens. Accordingly the further drawback appears that the resulting product is unsuitable for uses involving bending, elongation and shear stress work; the layer of polymer composition is stripped from a support such as a glass plate before coagulation, because in this case it is necessary to use a polymer composition containing a non-solvent for the polymer, still another drawback appears that the polymer composition is limited to one that is very thin; the layer of the polymer composition stripped from the support being non-coagulated, it tends to undergo deformation. Still another disadvantage is that the surface smoothness grows worse; because the layer of the polymer composition coagulates after being stripped from the support, it becomes difficult to prevent deformation due to shrinkage stress difference between the coating layer and the fibrous substrate layer. Still another drawback is that the resulting composite curls toward the layer which has a stronger shrinkage stress, which curling seriously hurts the high degree processability of the final product.

An object of the present invention is to provide a synthetic leather product which simultaneously satisfies on a balanced basis the general requirements of adhesive strength, flexibility resistance, softness, water vapor permeability, scuff resistance, heat resistance, tensile strength and elongation and tear strength, and to provide a method for very simply preparing such synthetic leather on an industrial scale. Another object of the present invention is to provide a method for preparing efficiently composites having a plurality of properties by freely varying the thickness of a coating layer from thin to thick and freely varying the added amount of a polymeric binder introduced at a step close to the end of the process. Other objects of this invention will become apparent from the following description.

In accordance with this invention, the synthetic product comprises a fibrous sheet layer and a coating layer consisting of a polymer coating composition, characterized in that A. the coating layer is a porous structure, and has a thickness of from about 0.05 mm to about 1.5 mm, B. the fibrous sheet layer consists of
1. a boundary layer united with said coating layer, said boundary layer consisting of a continuous and united polymer having a porous structure consisting of said polymer coating composition and said fibrous sheet material without containing a polymeric binder to be mentioned later, said boundary layer being from about 0.01 mm to about 0.2 mm in thickness, and
2. a layer of fibrous substrate, which is a layer other than the boundary layer in the direction of thickness of the fibrous sheet layer, consisting of said fibrous sheet and a polymeric binder, being from about 0.5 mm to about 1.8 mm in thickness; the synthetic leather simultaneously exhibiting a flexibility resistance of at least about $10\times10^4$ times, a water vapor permeability of at least about 5 mg/cm$^2$·hr and a scuff resistance of at least about 500 grams.

Further, this invention relates to a method of preparing synthetic leather consisting of a polymer and a fibrous non-woven fabric having a flexibility resistance of at least about $10\times10^4$, a water vapor permeability of at least about 5 mg/cm$^2$·hr and a scuff resistance of at least about 500 grams which comprises, in combination:

a. the step of pre-treating a fibrous sheet material with a mixed solution of a solvent and a non-solvent for the polymer of the coating composition at a weight ratio ranging from about 90/10 to about 65/35, b. the step of applying a polymer coating solution or dispersion to a support, lapping the resulting coating over the pre-treated fibrous sheet material obtained in step (a), uniting the overlapped pair by passing them between at least two rolls at a uniting clearance shown by the following expression:

$$0.5(X+Y) \leqq \text{uniting clearance} < 1.0(X+Y)$$

(wherein $X$ is the coated thickness of the polymer coating solution or dispersion and $Y$ is the thickness of the fibrous sheet material),
thereafter coagulating said polymer coating solution or dispersion to unite the fabric with the resulting porous coating layer, c. stripping the product off said support, d. introducing a solution or dispersion of a polymeric binder to the surface opposite to the coating surface of the fibrous sheet material, and e. coagulating said solution or dispersion of polymeric binder.

DRAWINGS

In FIG. 2, Y represents the thickness of the pre-treated fibrous sheet material, X represents the coating thickness of the polymer coating solution or dispersion, and C designates the clearance between the rolls 10, 10' at or near the point where the polymer coating and the fibrous sheet material come together.

The boundary layer which is one of the components of this invention is composed of 1 fibrous sheet material and 2 a coating polymer, but does not contain a so-called polymeric binder. In conventional synthetic leather, to be sure, a boundary layer exists. However, such conventional synthetic leather is composed of three elements, 1 fibrous sheet material, 2 a coating polymer and 3 a polymeric binder. Alternatively, it may be composed of four elements comprising elements 1, 2, 3 and 4 an adhesive layer.

The composition of the coating polymer 2 in this invention is the same as that of the porous coating layer existing in the upper part of the boundary layer, and the structure of the boundary layer composed of two elements 1 and 2 develops at the same time the leather characteristics of flexibility resistance, softness, surface smoothness, surface scuff resistance, abrasion resistance, appearance of surface creases and ease of their formation, leather-like feeling, air and water vapor permeability, adaptability to shoemaking, durability and comfort while wearing shoes — the latter two characteristics are required when the leather is used as a shoe upper and processability other than in shoemaking itself.

The boundary layer is composed of a fibrous sheet material and a coating polymer in which a polymeric binder does not exist. In order simultaneously to provide (a) flexibility resistance, (b) appearance of creases and ease of their formation, (c) surface smoothness, (d) surface strength, (e) air and water vapor permeability, (f) softness, (g) voluminous feel and (h) adhesion, it is preferable to control the thickness of the boundary layer to about 0.01–0.2 mm.

The layer of fibrous substrate of this invention is necessary by all means. In order to impart (i) leather-like properties, (j) ease in shoemaking, (k) tensile strength and elongation and (l) economy, besides potentially imparting at the same time the desirable leather characteristics (a)–(h), it is preferable to control the thickness of the layer of this fibrous substrate to about 0.5–1.8 mm.

The porous coating layer is necessary by all means and it is preferable to color this layer with any color including white. This layer is necessary especially for imparting (m) air and water vapor permeability, (n) softness, (o) voluminous feeling, and for preventing (p) rubber-like and paper-like feel, and in order to impart the aforesaid desirable characteristics of leather (a)–(h). Also, it is preferable to control the thickness of this porous layer to about 0.05–1.5 mm.

Further, in this invention, a colored non-porous coating layer may be formed on top of the porous coating layer. In order to achieve the leather characteristics of (a) flexibility resistance, (b) color tone and luster, (c) appearance of creases and ease of their formation, (d) surface smoothness, (e) surface strength and (f) appearance and feeling, and to prevent water permeability without losing (g) scuff resistance and (h) water vapor permeability, it is preferable to control the thickness of this colored non-porous layer to about 0.005-0.05 mm.

Furthermore, in this invention, a transparent non-porous coating layer may be formed on top of such colored non-porous coating layer. This transparent non-porous coating layer is not always necessary. However, it is necessary when luster is to be imparted to the surface of the leather. In order to enhance the leather characteristics by balancing the thicknesses with other layers, it is preferable to control the thickness of the transparent non-porous layer to about 0.001-0.01 mm.

In this invention, a colored non-porous coating layer and a transparent non-porous coating layer may be referred to altogether as a finishing layer. The colored non-porous coating layer is necessary for imparting a color tone to the porous coating layer, and imparting surface strength, creases and leather-like appearance and feeling to the porous coating layer. In order to impart these various properties, it is recommended to use a composition which is the same as that of the porous layer for the colored non-porous coating layer. Preferably, the colored non-porous coating layere is a copolymer having a 20 percent modulus which is higher than the 20 percent modulus of the porous coating layer, namely having such a modulus of about 5-100 kg/cm$^2$, preferably about 10-70 kg/cm$^2$ and more preferably about 15-50 kg/cm$^2$.

It is necessary that the transparent non-porous coating layer should impart luster to the colored non-porous coating layer without downgrading the aforesaid leather characteristics. And so, it is necessary to use as the transparent non-porous coating layer, a polymer of the same structure as that used as the porous coating layer or colored non-porous coating layer.

In the practice of this invention, it is required that the aforesaid respective layers should exist and the aforesaid thicknesses and objective leather properties be satisfied at the same time.

Especially, in order to prepare synthetic leather which is soft and which has excellent water vapor permeability and has an excellent surface appearance of creases upon being bent, it is preferable to use, as the aforesaid polymer composition, a polymer composition (B), the polymer in which is composed of at least about 60 percent by weight of polyurethane, which composition contains about 50-300 parts by weight of a water-soluble inorganic compound having a mean particle diameter of about 0.03-5.0 microns based on 100 parts by weight of said polymer. The surface appearance of creases upon being bent varies with the combined amount of said inorganic compound. In order to make the appearance of the creases of said synthetic leather just the same as that of German Box Calf which is said to be the highest grade natural leather, it is recommended to blend about 120-160 parts by weight of the inorganic compound based on 100 parts by weight of the polymer. In order to make the appearance of the creases of the leather just the same as that of calf and kip that are said to be either higher grade or middle grade natural leather, it is recommended to blend about 80-120 parts by weight or about 160-200 parts by weight of said inorganic compound based on 100 parts by weight of said polymer. Again, in order to make the appearance of creases of said synthetic leather just the same as that of side leather which is said to be the lowest grade of natural leather, it is recommended to blend about 50-80 parts by weight or about 200-300 parts by weight of said inorganic compound based on 100 parts by weight of said polymer.

Further, in order to prepare a composite having excellent softness, water vapor permeability, and surface appearance of creases upon being bent, as well as flexibility resistance, scratch resistance, scuff resistance and surface smoothness, it is recommended to use a laminate of at least (A) layer and (B) layer of the polymer composition as the porous coating layer. Namely, the composition (A) is a polymer composition, the polymer of which is composed of at least about 80 percent by weight of polyurethane, containing about 0-50 parts by weight of a water-insoluble inorganic compound having a mean particle diameter of about 0.03-5.0 microns based on 100 parts by weight of said polymer. The preferable combined amount of this inorganic compound is about 0-20 parts by weight, preferably 0 part by weight based on 100 parts by weight of the polymer. It is recommended to unite the surface of the fibrous sheet material with the surface of the layer (B) of the layers (A)/(B) of the polymer composition. A trilayer construction of the polymer composition having the relationship (A)/(B)/(A) may be used, in which case, it is natural to unite the surface of the (A) layer with the surface of the fibrous sheet material.

The following compounds may be used as the inorganic compound used herein: calcium carbonate, titanium oxide, zinc oxide, kaolinite, zinc carbonate, copper carbonate, barium carbonate, chromium oxide, aluminium oxide, antimony oxide, cobalt oxide, tin oxide, iron oxide, silicon oxide, calcium sulfate, barium sulfate, zinc phosphate, aluminium phosphate, kaolin and mixtures of at least two of the foregoing compounds. Especially preferable inorganic compounds are calcium carbonate, titanium oxide, zinc oxide, aluminium oxide, silicon oxide, kaolinite and kaolin.

In this invention, it is recommended to use the following compounds as the polymer in the polymer composition. It is recommended to use a substantially linear polyurethane or polyurethane mixture obtained by reacting a macromolecular diol such as a hydroxyl-terminated polyester, polyether, polyetherester and polyester amide or a mixture thereof with an organic diisocyanate, diamine and/or a low molecular diol, or a copolymer or mixture containing at least two types of compounds selected from the group consisting of said polyurethane, polyvinyl chloride, polyvinylidene chloride, polyvinyl acetate, polyacrylic acid, alkyl-polyacrylate, polymethacrylic acid and alkyl-polymethacrylate. When using a polymer in admixture with another polymer, both being other than polyurethane, it is convenient for achieving the objects of this invention when the concentration of polyurethane is at least about 50 percent by weight. The polymer composition referred to herein is composed of at least said polymer, a solvent therefor and/or a non-solvent therefor.

The concentration and viscosity of the polymer coating solution may be selected within wide ranges without harming the effect of this invention. It is preferable that the concentration be from about 10 to about 50 percent and the viscosity be from about 10 poises to about 8,000 poises. When the concentration and viscosity are outside these ranges, this is not necessarily inconvenient, depending upon use. However, it tends to be undesirable in the following respects:

A. When the concentration is less than about 10 percent the viscosity is less than about 10 poises:
 a. A coating layer having a constant thickness cannot be obtained, because the polymer coating composition layer is apt to flow until the polymer coating composition layer is coagulated partially or completely.
 b. Macro-pores are scattered in the coating layer and the resulting porous structure cannot be made uniform. And so, in the finish-processing step such as embossing, the macro-pores collapse and unevenness is developed on the coating surface.
 c. It is difficult to control the thickness of the boundary layer, on account of which there is fluctuation of the qualities of the final leather, such as flexibility resistance, water vapor permeability, scuff resistance and softness.
 d. It is difficult to thicken the coating layer, and so the uses of the product are limited.

B. When the concentration is greater than about 50 percent, and the viscosity is greater than about 8,000 poises:
 a. It is difficult to mix each combination component in the polymer coating composition uniformly.
 b. It is difficult to remove air foam contained in the polymer coating composition. Because said air foam remains in the polymer coating composition layer, the surface smoothness of the coating layer becomes worse.
 c. It is difficult to coat uniformly.
 d. Adhesion of the coating layer to the fibrous sheet layer is weak.
 e. The coagulation speed is so fast that it is difficult to prepare a coating layer of uniform porous structure.

The polymer in the polymeric binder used in this invention is a polymer used in the polymer composition, or a copolymer containing at least two kinds of the following polymers: polyacrylic acid, alkyl-polyacrylate, polymethacrylic acid, alkyl-polymethacrylate, polyvinyl chloride and polyvinyl acetate. When it is used in the form of solution, dispersion, emulsion or paste, it is convenient for achieving the object of this invention.

It is permissible to blend, with said polymer composition and polymeric binder, pigments, dyes, dispersing agents, surface active agents, pore-forming agents, coagulation stabilizers, inorganic powders, organic powders (including staple fibers, cut pile and pulp), other fillers and additives, either singly or in admixture. When a non-solvent for the polymer in the polymer composition is added to the polymer composition, the storage properties of the composition are adversely affected. However, its addition is permissible when the composition is to be used promptly after the addition.

The concentration and viscosity of the solution of polymeric binder may be selected within ranges without adverse effect upon this invention. It is preferable that the concentration ranges be from about 3 to about 50 percent, and the viscosity ranges from about 0.5 poises to about 300 poises. When the concentration and viscosity are outside of these ranges, this is not necessarily inconvenient, depending upon the use. However, it tends to be undesirable in the following respects:

A. When the concentration is less than about 3 percent, and the viscosity is less than about 0.5 poises:
 a. A limited amount of binder adheres.
 b. The binder tends to be introduced into the boundary layer, resulting in decreased flexibility resistance, water vapor permeability, scuff resistance, softness and appearance of surface creases
 c. Upon introducing the binder into the fibrous sheet material, the latter tends to elongate and becomes difficult to handle in processing.
 d. The pigments and other fillers are difficult to disperse.

B. When the concentration is more than about 50 percent and the viscosity is more than about 300 poises:
 a. The binder is difficult to introduce into the fibrous sheet material.
 b. It is difficult to control the amount of binder that adheres.

Fibers constituting the fibrous sheet material used in this invention include synthetic fibers such as polyamide, polyester, polyester amide, polyacryl and polypropylene; natural fibers suc as cotton, wool, hemp and silk; regenerated fibers such as rayon; semi-synthetic fibers such as acetate, and either singly or mixed fibers of two or more of these fibers.

In order to impart excellent softness, flexibility resistance, appearance and feeling and draping properties to the composite of this invention, it is desirable to use fibers such as polyester or polyamide consisting of ultra fine fiber bundles of less than about 1.0 denier, or ultra fine fibers obtained by blend spinning. Further, for uses requiring the hand characteristics of natural leather, it is desirable to use polyacrylonitrile.

It is recommended to use a fibrous sheet material obtained from the aforesaid fibers, whose weight per unit area ranges from about 80 to about 300 g/m$^2$, preferably from about 100 to 250 g/m$^2$. When such a fibrous sheet material is used after slicing midway in the direction of thickness, it is preferable to control the weight per unit area of about 2 times the aforesaid range. Such a fibrous sheet material is used in the form of non-woven fabric, knitted or woven fabric or a combination of non-woven fabric and knitted or woven fabric.

The release support used in this invention may include a glass plate, steel plate, release paper, plastic film, aluminum foil or specially processed knitted or woven fabric. The surface of these supports may range from smooth to various uneven patterns for the object of this invention. In order to apply the polymer composition to these supports, it is recommended to use a reverse roll coater, doctor knife coater and wire bar.

The fibrous sheet material treated with a mixed solution of this invention is prepared as follows. The fibrous sheet material is either immersed in a mixed solution of a solvent and a non-solvent containing about 65–90 percent by weight of a solvent for the polymer composition and for the polymer in the polymeric binder, or the mixed solution may be sprayed on the fibrous sheet material.

The applied amount of this mixed solution may vary depending upon the weight per unit area of the fibrous sheet material, the concentration of the solvent in the mixed solution, and the uniting clearance. However, this amount is generally about 20–250 parts by weight, preferably about 70–200 parts by weight and more preferably about 110–170 parts by weight based on 100 parts by weight of the fiber.

The concentration of the solvent in the mixed solution is limited. When the concentration of the solvent is 0 part by weight, i.e., when using non-solvent only, the boundary adhesive strength between the polymer coating layer and the fibrous sheet material layer is very low and the desired composite cannot be achieved. In order to obtain the necessary adhesive strength, it is necessary to provide a very small uniting clearance, as will be emphasized in detail hereinafter. However, in this case the product develops a hard hand, its flexibility resistance drops sharply, and the fiber naps protrude from the surface of the polymer coating layer and a smooth surface cannot be obtained. Also, the pore structure of the polymer coating layer varies and macro-pores visible to the naked eye are scattered, which brings about good water vapor permeability and air permeability but poor scuff resistance, flexibility resistance, impact resistance, surface quality, appearance and hand characteristics.

Solvents used for the mixed solution include N, N-dimethyl formamide, N, N-dimethyl acetamide, dimethyl sulfoxide, dimethyl sulfone, tetrahydrofuran, dioxane, hexamethyl phosphoramide, trimethyl phosphate, analogues of these compounds or a mixture of at least two kinds of these compounds. Non-solvents used for the mixed solution include water, methanol, ethanol, acetone, ethylene glycol, glycerine, glycol monoethylether, hydroxy ethyl acetate, tert-butanol, 1, 1, 1-trimethylol propane, hexane, benzene, toluene, naphtha, dioxane, tetrachloroethylene, chloroform, analogues of these compounds and mixtures of two or more of these compounds.

The applied amount of the mixed solution is limited. When the amount of mixed solution is less than 20 parts by weight based on 100 parts by weight of the fiber, the pore structure of the coating layer is not uniform, macro-air foams enter the surface portion and a compact and smooth coated surface cannot be obtained, and it is difficult to control the amount of the polymer composition which deposits on the fibrous material. On the contrary, applying more than about 250 parts of the mixed solution results in creation of macro-air foam collections in the boundary layer between the coating layer and the fibrous substrate layer, because of which the adhesive strength is non-uniform and the flexibility resistance varies from place to place.

Figure 1:
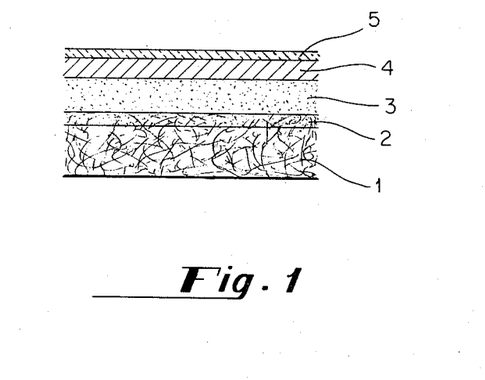
FIG. 1 shows one example, in cross-section, of a piece of synthetic leather according to this invention, wherein 1 is a layer of fibrous substrate, 2 is a boundary layer, 3 is a porous coating layer, 4 is a (colored) non-porous coating layer, and 5 is a transparent non-porous coating layer.
Figure 2:
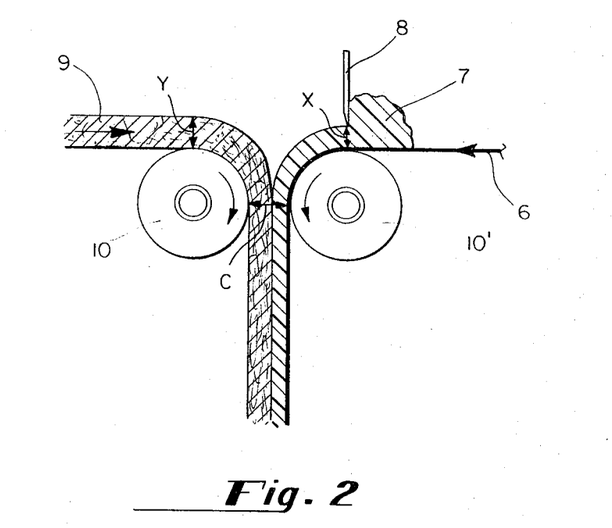
FIG. 2 is a schematic view showing one way in which elements according to this invention may be combined. The clearance of the rolls according to this invention is shown. The number 6 designates a release support, 7 is a polymer coating solution or dispersion, 8 is a coating knife, 9 is a pre-treated fibrous sheet material, and 10 10' are the rolls.
Figure 3:
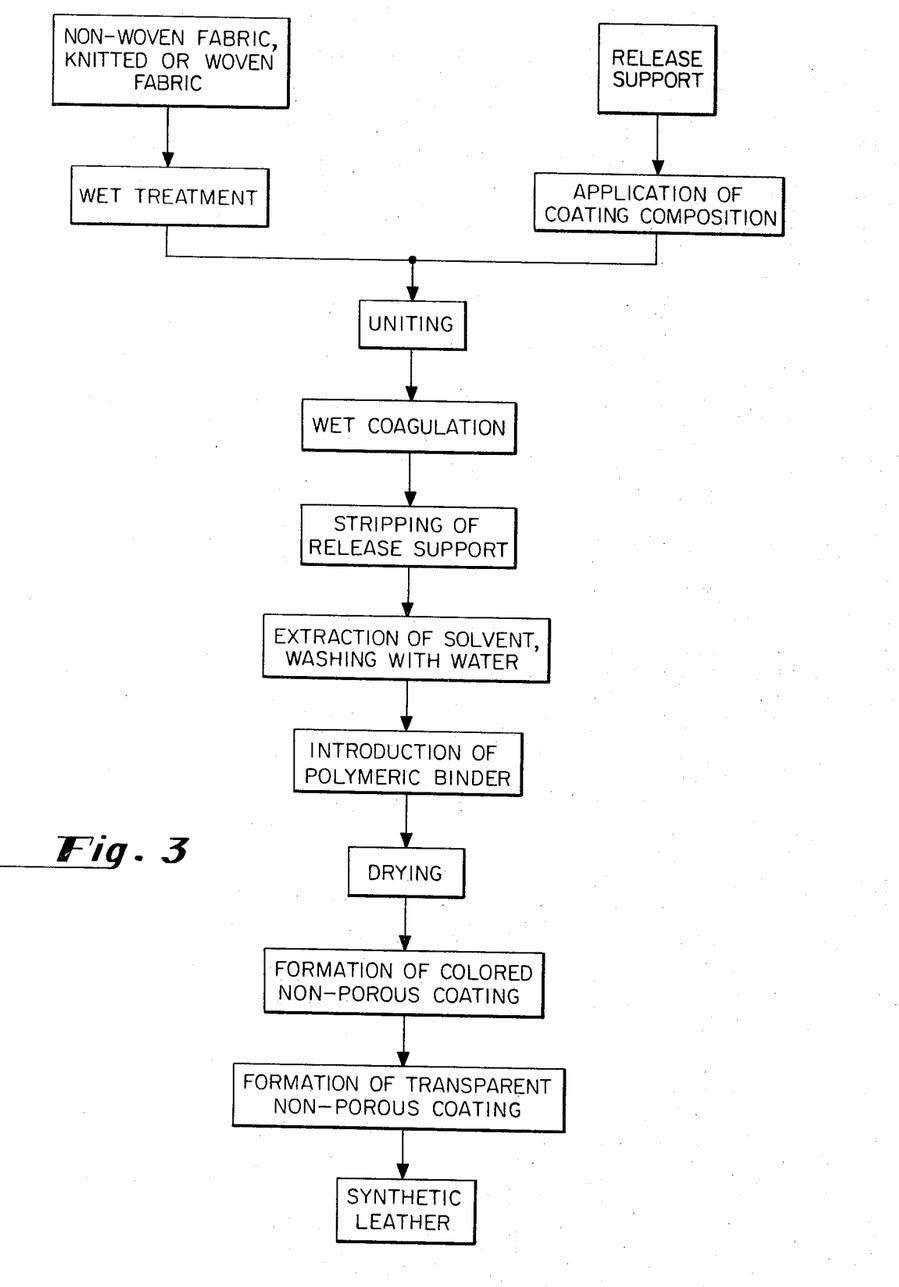
FIG. 3 is a flow chart showing one form of method of preparing synthetic leather according to this invention.

The layer of the polymer composition coated onto the release support is contacted on the fibrous sheet material treated with the mixed solution obtained by the aforesaid conditions and method, the two are held down at a uniting clearance defined hereinafter, and thereafter wet- or dry-coagulated to unite the polymer coating layer with the fibrous sheet material. The uniting clearance should be as follows:

$$0.5 \leq \frac{\text{Uniting clearance}}{X + Y} < 1.0$$

wherein as shown in FIG. 2, $X$ is the thickness of the layer of polymer composition, and $Y$ is the thickness of the fibrous sheet material.

The expression "uniting clearance/$X+Y$" is a uniting clearance ratio, which is preferably about 0.5 to less than 1.0 (not includingn 1.0), preferably from about including to about 0.98, and more preferably from about 0.6 to about 0.95. When the uniting clearance ratio is less than 0.5, although the coating layer and the fibrous sheet material adhere to each other strongly, various properties suffer, such as flexibility resistance, softness, coating surface smoothness, hand characteristics and appearance. Accordingly, in this case it is not possible to provide all of the various properties required of the composite.

On the other hand, when the uniting clearance is not less than 1.0, the adhesion of the coating to the fibrous sheet material becomes very weak and its function as a composite becomes poor. Specifically, stripping occurs at the time of bending, in the stages of processing to the final product, and while the product is being used. Accordingly, it is important to effect uniting at a uniting clearance ratio in the stated range.

As mentioned, wet- or dry-coagulation is carried into effect after uniting. Thereafter, the release support is stripped when necessary. Further, the product is washed with hot water and/or water at room temperature (in the case of wet-coagulation) and subsequently the polymeric binder is introduced to the surface of the fibrous sheet material to obtain a composite which is the product of this invention. From the viewpoint of water vapor permeability, air permeability, softness, hand characteristics and appearance, wet-coagulation is superior after uniting. However, dry-coagulation suffices, depending upon the use.

Upon preparing a composite by wet-coagulation, it is an industrially advantageous procedure to strip the release support after wet-coagulation. Stripping may be done (a) after wet-coagulation, (b) after washing with hot water and/or water at room temperature, or (c) after the polymeric binder is introduced and dried. Method (a) is superior; washing speed and productivity are high. Stripping before coagulation is conceivable as a possibility; however, because the layer of the polymer composition before coagulation has natural fluidity, it is substantially impossible to strip at this time.

In the method of this invention, the temperature of the coagulating bath is preferably but not necessarily within the range from about 5° to 50° C.

When coagulation is effected at a temperature less than 5° C, the coagulating speed is low and the coating layer tends to undergo deformation during coagulation, because of lack of smoothness of the coating surface.

When coagulation is effected at a temperature exceeding 50° C, the coagulating speed is high and many macro-pores are produced in the coating. It is difficult to produce a coating having a uniform porous structure satisfying the various properties required.

Regarding the introduction of the polymeric binder into the fibrous sheet material, the timing may be (a) after uniting and wet-coagulation or dry-coagulation, (b) after wet-coagulation and washing or (c) after wet-coagulation, washing and drying. When the coating layer is wet-coagulated, the aforesaid times (a) or (b) are industrially superior. The form of the polymeric binder may be a solution, emulsion or paste. However, it is especially preferable to introduce the emulsion of a non-solvent for the polymer composition and a polymer in the polymeric binder or the fibrous sheet material at the time (b). The polymeric binder is introduced to the surface of the fibrous sheet material which is united with the coating layer by coating or spraying with a reverse roll coater, gravure roll coater, doctor knife coater, wire bar, sprayer and so on. Especially, the polymeric binder is introduced most quantitatively when the gravure roll coater or reverse roll coater is used.

That the post-introducing method of this invention is superior to the conventional pre-impregnating method will be explained by citing a few examples.

A. The post-introducing method of this invention treats the fibrous sheet material containing a substantially small amount of moisture with the mixed solution, therefore, it is unnecessary to control the composition of the mixed solution. In contrast, in the conventional pre-impregnating method, the fibrous sheet material is immersed in a polymer impregnating composition, wet-coagulated and treated with the mixed solution containing the coagulation solvent per se. Therefore, the composition of the mixed solution varies continuously. In order to keep this composition constant and industrially prepare a stable composite, the solvent or non-solvent must be supplied continuously and quantitatively into the mixed solution, which is difficult.

B. In the post-introducing method of this invention, it is very easy to obtain a uniform porous coating layer structure. In contrast, in the conventional pre-impregnating method, the porous structure is uniform at places where the adhering amount of polymer impregnating composition is small. However, the porous structure is non-uniform at places where said adhering amount is large. Because of that, the uses of the resulting composite are limited to narrow ranges, and such method is unsuitable for preparing many kinds of composites. There are various reasons why said porous structure does not become uniform. It is considered that in the step of uniting the fibrous substrate impregnated with a polymer impregnating composition with the layer of the polymer composition and coagulating the united product, the air contained in this fibrous substrate is difficult to remove (the more so as the adhering amount of polymer impregnating composition increases), and a majority of the air diffuses toward the layer of the polymer composition. Therefore, macropores easily visible to the naked eye are produced on the coating layer of the resulting composite. As a result, the quality of the composite drops greatly.

C. The post-introducing methods of this invention, include an advantageous method in which one step of wet-coagulation is sufficient. Then the coating layer is made into a porous structure by wet-coagulation after uniting and thereafter, the polymeric binder is introduced into the layer of fibrous sheet material and dried, the product has excellent water vapor permeability, air permeability, softness, flexibility resistance and hand characteristics when obtained from the coating layer by the wet system. Various properties such as excellent mechanical strengths are obtained from the fibrous substrate by the dry system. In contrast, the conventional pre-impregnating method where the fibrous sheet material is immersed in the polymer impregnating composition and wet-coagulated over which material, the layer of the polymer composition is put wet-coagulated and united, it is necessary to effect wet-coagulation twice, which is industrially disadvantageous. Further, in the post-introducing method of this invention, there is a method in which one-time washing after wet-coagulation and one-time drying suffice, which is industrially advantageous.

D. In the post-introducing method of this invention, the fiber used for the fibrous sheet material may be selected from a broad range. Because in this invention a mixed solution of solvent and a non-solvent is used in treating, it is possible to prepare the objective composite of this invention by an industrially advantageous method using not only conventional fibers but also fiber (a) soluble or swellable in the solvent for the polymer impregnating composition or the composition, for example, N, N-dimethyl formamide. By contrast, in the conventional pre-impregnating method, because fiber (a) dissolves or swells during impregnation, it cannot be used. In the conventional method, also, if the polymer impregnating composition is immersed in a non-solvent type emulsion, a fibrous substrate is obtained. However, when it is united with the coating layer, the fiber dissolves or swells and therefore is not preferable. In contrast, in this invention, it is possible to introduce the non-solvent type emulsion as the polymeric binder after the fibrous sheet material and the layer of the polymer composition are united and coagulated. Therefore, dissolution or swelling of the fiber does not take place.

E. By the post-introducing method of this invention, the coagulation speed and washing speed are high. Moreover, a composite which is stable in quality may be obtained. Upon uniting the layer of the polymer composition with the fibrous sheet material, because the speed of substitution of the solvent of the layer of the polymer composition with the coagulation solvent is high, the coagulation speed is also high, and productivity is high as well. The same can be said of dry-coagulation, namely, the evaporation speed of the layer of the polymer composition is high and the coagulation speed is high accordingly. Also, the speed of washing for extracting the solvent after wet-coagulation is fast, and productivity is high. By contrast, in the conventional pre-impregnating method, because the fibrous substrate consisting of the fibrous sheet material already containing the impregnating composition is put on the layer of the polymer composition, the greater the adhered amount of the polymer impregnating composition, the slower the coagulation speed. The same can be said of the speed of washing for extracting the solvent.

As mentioned above, in the method of this invention, the coagulation speed, speed of extracting and washing the solvent and drying speed are high. Moreover, when especially the wet-coagulation method is carried out, the porous structure of the coating layer is obtained uniformly and in a stabilized state. In this connection, when an effort is made to increase the speeds of the wet-coagulation in the conventional method, macropores are scattered in the coating layer and the physical properties of the coating are harmed.

F. The post-introducing method of this invention has the advantage that various kinds of composites may be prepared efficiently in accordance with the desired uses. Namely, at first, intermediates are prepared by uniting the layer of polymer composition with the fibrous sheet material, and the objective composites may be prepared efficiently by properly selecting the kind and amount of polymeric binder, the weight per unit area of the composite and the coagulation method in accordance with various uses to provide the desired softness, flexibility resistance, hand characteristics and mechanical strengths. By contrast, in the conventional pre-impregnating method, because the polymer impregnating composition is already contained in the fibrous sheet material, it is impossible to prepare the required composite by changing on the way.

Prior efforts toward improvement have been aimed at uniting the fibrous substrate obtained by impregnating and imparting the polymer impregnating composition in and to the fibrous sheet material with the coating. Accordingly, the improved content has been essentially insignificant. In this invention, composites are prepared not by uniting the fibrous sheet material with the coating layer but by an entirely novel method of uniting the fibrous sheet material with the layer of the polymer composition, and thereafter introducing the polymeric binder by a method other than impregnation into the portion of a fiber layer. Accordingly, this is an extensive improvement; it is possible to prepare various kinds of composites suitable for multi-uses in quality by a simple method not requiring many steps. Wholesale improvements are made in this invention as compared with the conventional method.

In the following examples, parts and percentages are by weight unless otherwise indicated.

Examples 1-6 (and Comparative Examples A, B)

From 1.5 denier polyacrylic fiber, a non-woven fabric having a thickness of 1.0 mm was prepared. This non-woven fabric was immersed in a mixed solution consisting of 80 percent of dimethyl formamide (DMF) and 20 percent of water, and said non-woven fabric was squeezed such that this mixed solution was present in an amount of 160 parts based on 100 parts of the fiber to obtain a non-woven fabric treated with the mixed solution.

On the other hand, the reaction product of polytetramethylene ether glycol with phthalic acid was further reacted with 1, 4-butane diol to synthesize a macromolecular ether-ester copolymeric diol. This macromolecular diol was reacted with diphenylmethane-4,4'-diisocyanate and 4, 4'-diaminodiphenyl methane in DMF to synthesize a DMF solution with 25 percent of polyurethane consisting of ether-ester copolymeric diol. Pigments and other necessary combination components were mixed with this polyurethane solution, the mixture was stirred and foams contained in the mixture were removed to make a polymer coating composition. The concentration of this polymer coating composition was 23 percent and its viscosity thereof (at 20° C) was 1,010 poises. Next, said polymer coating composition was coated on a polyethylene terephthalate film, so that the coating thickness was 1.0 mm, on top of which said non-woven fabric treated with the mixed solution was contacted. Said contacted material was passed between rolls whose uniting clearance/(X+Y) was adjusted to eight different values as shown in Table 1 and united. Thereafter, it was coagulated in a water bath at 25° C, washed with water at 90° C to extract the solvent and squeezed.

A polymeric binder obtained by blending pigments and other necessary combination components with the aqueous emulsion of butyl-polyacrylate, having a concentration of 5 percent and a viscosity (at 20° C) of 3 poises was applied to the surface of the non-woven fabric of a composite in which the coating was united with the non-woven fabric to thereby introduce said polymeric binder into the non-woven fabric, which binder was dried at 120° C for 15 minutes. The amount of this binder adhered as solid was 50 parts based on 100 parts of the fiber. One example of various properties of the so-obtained eight kinds of composites appears in Table 1.

Hereinbelow, brief explanations will be made about methods of measuring the various properties listed in Table 1. These methods of measuring are used in the following examples.

1. The thickness of the coating, thickness of the boundary layer and thickness of the fibrous substrate layer were determined from sectional photomicrographs. The thickness of the coating is a measured value of only the coating portion substantially not containing naps of the fibrous substrate layer. The thickness of the composite is a value measured by using a dial gauge under a load of 200 g. (2) The pore uniformity of the coating was determined from a photograph used in measuring the thickness of the coating and by visual examination. (3) The adhesive strength was determined by making a slit at the boundary of the coating and the fibrous substrate layer, which was pulled on both sides and the resistance of stripping was compared. (4) The flexibility resistance was measured at a flex speed of 300 times per minute under conditions of elongation of 25 percent and compression of 60 percent using a DeMattia Flex Tester. (5) The scuff resistance was measured by using a standard Clemence Scratch Resistance Tester. (6) The water vapor permeability was measured in accordance with JIS (Japanese Industrial Standard) K-6549. (7) The softness was measured in accordance with JIS L-1079. (8) The unevenness on lasting is indicated as an uneven pattern of the vamp part produced at the time of shoemaking, which was estimated in comparison with that of natural leather. (9) The stripping state after wearing was measured by observing the state of adherence of the coating layer to the fibrous substrate layer of a pair of shoes by breaking up and cutting off the shoes after every month of wearing. Of the aforesaid characteristics, the water vapor permeability, softness, hand characteristics, unevenness on lasting and stripping state (adherence) are measured results of a composite laminating a non-porous coating layer (thickness of about 15 microns) consisting of polyurethane on the porous coating layer. The composite laminate is usable as an upper leather, bags, interior materials, boots, belts, sandals, and so on.

Table 1

$\dfrac{\text{Uniting clearance}}{X + Y}$ (uniting clearance ratio) and various properties of composite X = thickness of the layer of polymer composition Y = thickness of non-woven fabric

| CE*-A | Ex*-1 | Ex-2 | Ex-3 | Ex-4 | Ex-5 | Ex-6 | CE-B |

Table 1 — Continued $\frac{\text{Uniting clearance}}{X + Y}$ (uniting clearance ratio) and various properties of composite X = thickness of the layer of polymer composition Y = thickness of non-woven fabric

| | CE*-A | Ex*-1 | Ex-2 | Ex-3 | Ex-4 | Ex-5 | Ex-6 | CE-B |
|---|---|---|---|---|---|---|---|---|
| Uniting clearance $\frac{}{X+Y}$ | 0.30 | 0.52 | 0.57 | 0.63 | 0.94 | 0.97 | 0.98 | 1.00 |
| Thickness of coating (mm) | 0.028 | 0.179 | 0.196 | 0.255 | 0.307 | 0.347 | 0.350 | 0.358 |
| Thickness of boundary layer(mm) | 0.335 | 0.181 | 0.163 | 0.107 | 0.053 | 0.015 | 0.009 | 0.002 |
| Thickness of composite (mm) | 1.02 | 1.16 | 1.19 | 1.25 | 1.27 | 1.33 | 1.34 | 1.35 |
| Pore uniformity of coating | Poor | Good | Good | Excellent | Excellent | Good | Fair | Poor |
| Adhesive strength | Excellent | Excellent | Excellent | Excellent | Excellent | Good | Fair | Poor |
| Flexibility resistance ($\times 10^4$) times | 1.5 | 27 | 39 | 68 | 75 | 70 | 72 | Stripped |
| Scuff resistance(g) | 900 | 1300 | 1500 | 2000 | 2000 | 1500 | 1000 | 200 |
| Water vapor permeability (mg/cm$^2$·hr) | 12.7 | 13.5 | 13.5 | 15.0 | 14.7 | 13.9 | 14.0 | 15.2 |
| Softness | 4250 | 3010 | 2560 | 1830 | 1805 | 1700 | 1750 | 1760 |
| Hand characteristics | Very Poor | Fair | Good | Excellent | Excellent | Excellent | Good | Fair |
| Unevenness on lasting | Very poor | Fair | Good | Excellent | Excellent | Excellent | Fair | Stripped |
| Stripping after wearing shoes | 6 m* | 6 m | 6 m | 6 m | 6 m | 4 m | 2 m | 1 m |

NOTE:
CE* = Comparative Example
m* = months
EX* = Example

Examples 7-11 (and Comparative Examples C, D)

Example 3 was repeated except for varying the concentration of the solvent in the mixed solution to seven values as shown in Table 2 in preparing seven kinds of composites. One example of various properties of the resulting composites appears in Table 2.

Examples 12-17 (and Comparative Examples E, F)

Example 3 was repeated except for varying the added amount of the mixed solution upon applying the mixed solution to non-woven fabric in preparing eight kinds of composites. One example of various properties of the resulting composites appears in Table 3.

Examples 18–19 (and Comparative Examples G, H)

Example 3 was repeated except for changing the concentration of polyurethane in the polymer coating composition to 100, 50, 30 and 0 percent in preparing four kinds of composites. The polymer other than polyurethane used in these examples was a copolymer of vinyl chloride and vinyl acetate. One example of various properties of the resulting composites appears in Table 4.

Table 2

Concentration of the solvent in the mixed solution and various properties of the composite

| | CE*-C | Ex*-7 | Ex-8 | Ex-9 | Ex-10 | Ex-11 | CE-D |
|---|---|---|---|---|---|---|---|
| Concentration of solvent in the mixed solution (wt %) | 0 | 20 | 65 | 70 | 80 | 90 | 100 |
| Thickness of coating (mm) | 0.348 | 0.316 | 0.305 | 0.302 | 0.254 | 0.186 | 0.120 |
| Thickness of boundary layer (mm) | 0.009 | 0.044 | 0.056 | 0.058 | 0.110 | 0.175 | 0.241 |
| Thickness of composite (mm) | 1.34 | 1.31 | 1.30 | 1.30 | 1.25 | 1.20 | 1.15 |
| Pore Uniformity of coating | Very poor | Fair | Good | Excellent | Excellent | Good | Fair |
| Adhesive strength | Very poor | Fair | Good | Excellent | Excellent | Good | Good |
| Flexibility resistance ($\times 10^4$ times) | Stripped | 72 | 70 | 70 | 55 | 50 | 40 |
| Scuff resistance (g) | 200 | 1250 | 1400 | 1850 | 1900 | 1850 | 1850 |
| Water vapor permeability (mg/cm²·hr) | 12.0 | 13.0 | 15.0 | 15.0 | 14.0 | 13.5 | 14.0 |
| Softness (mg) | 1710 | 1700 | 1720 | 1750 | 1750 | 1800 | 1850 |
| Hand characteristics | Poor | Fair | Good | Excellent | Excellent | Good | Fair |
| Unevenness on lasting | Stripped | Fair | Excellent | Excellent | Excellent | Good | Fair |
| Stripping state after wearing shoes | >1 m* | >2 m | >4 m | >6 m | >6 m | >6 m | >6 m |

NOTE:
CE* = Comparative Example
EX* = Example
m* = months

Table 3

The applied amount of the mixed solution and various properties of the composite

|  | CE*-E | Ex*-12 | Ex-13 | Ex-14 | Ex-15 | Ex-16 | Ex-17 | CE-F |
|---|---|---|---|---|---|---|---|---|
| Added amount of mixed solution (parts/100 parts of fiber) | 0 | 20 | 70 | 110 | 170 | 200 | 250 | 300 |
| Thickness of coating (mm) | 0.357 | 0.349 | 0.270 | 0.261 | 0.250 | 0.189 | 0.175 | 0.147 |
| Thickness of boundary layer (mm) | 0.008 | 0.012 | 0.094 | 0.105 | 0.113 | 0.177 | 0.193 | 0.220 |
| Thickness of composite (mm) | 1.36 | 1.35 | 1.24 | 1.26 | 1.24 | 1.20 | 1.18 | 1.15 |
| Pore uniformity of coating | Very Poor | Fair | Good | Excellent | Excellent | Good | Fair | Poor |
| Adhesive strength | Poor | Fair | Good | Excellent | Excellent | Good | Fair | Fair |
| Flexibility resistance ($\times 10^4$ times) | 3 | 27 | 50 | 68 | 65 | 60 | 52 | 25 |
| Scuff resistance (g) | 1000 | 1200 | 1300 | 1600 | 1500 | 1500 | 1000 | 300 |
| Water vapor permeability (mg/cm$^2$·hr) | 13.6 | 13.0 | 13.5 | 14.0 | 13.8 | 14.2 | 14.0 | 13.7 |
| Softness (mg) | 4300 | 3750 | 2050 | 1750 | 1700 | 1720 | 1750 | 1700 |
| Hand characteristics | Very poor | Fair | Good | Excellent | Excellent | Good | Fair | Poor |
| Unevenness on lasting | Very poor | Fair | Good | Excellent | Excellent | Good | Fair | Very poor |
| Stripping state after wearing shoes | 1 m* | 2 m | 4 m | 6 m | 6 m | 4 m | 2 m | 1 m |

NOTE:
CE* = Comparative Example
Ex* = Example
m* = months

Table 4

Concentration of polyurethane (PU) $\left(\dfrac{PU}{entire\ polymer} \times \right) 100$ in the polymer coating composition and various properties of the composite

|  | Ex*-18 | Ex-19 | CE*-C | CE-H |
|---|---|---|---|---|
| PU concentration (wt %) | 100 | 55 | 35 | 0 |
| Thickness of coating (mm) | 0.255 | 0.256 | 0.253 | 0.255 |
| Thickness of boundary layer (mm) | 0.103 | 0.102 | 0.107 | 0.105 |
| Thickness of composite (mm) | 1.25 | 1.23 | 1.20 | 1.05 |
| Pore uniformity of coating | Excellent | Good | Poor | Non-porous |
| Adhesive strength | Excellent | Excellent | Fair | Poor |
| Flexibility resistance ($\times 10^4$ times) | 65 | 25 | 10 | 4 |
| Scuff resistance (g) | 1400 | 1500 | 1500 | 2000 |
| Water vapor permeability (mg/cm$^2$·hr) | 14.2 | 10.5 | 8.0 | 0.2 |
| Softness (mg) | 1740 | 2750 | 3320 | 4570 |
| Heat resistance | Excellent | Good | Fair | Very poor |
| Hand characteristics | Excellent | Good | Poor | Very poor |
| Unevenness on lasting | Excellent | Good | Poor | Very poor |
| Stripping state after wearing shoes | 6 m* | 4 m | 1 m | 1 m |

NOTE:
Ex* = Example
CE* = Comparative Example
m* = months

Examples 20–25

The following six compositions were prepared in the manner of Example 4.

A DMF solution with 5 percent of polyurethane having a viscosity of 3.0 poises at 20° C (Example 20)

A DMF solution with 5 percent of polyurethane/methyl polyacrylate (70%/30%) having a viscosity of 2.7 poises at 20° C (Example 21)

A DMF solution with 5 percent of methyl polyacrylate having a viscosity of 2.0 poises at 20° C (Example 22)

A DMF solution with 5 percent methyl polyacrylate having a viscosity of 1.5 poises at 20° C (Example 23)

An aqueous emulsion with 5 percent of polyurethane/methyl polyacrylate (70%/30%) having a viscosity of 1.3 poises at 20° C (Example 24)

An aqueous emulsion with 5 percent of polyacrylic acid having a viscosity of 0.9 poises at 20° C (Example 25)

All of the six kinds of composites obtained by using the aforesaid six polymeric binders achieved the object of this invention, of which Example 25 was especially good, followed by Examples 24, 23, 22, 21 and 20 in this order.

Examples 26–30 (and Comparative Examples I, J, K, L)

Example 4 was repeated except for making the amount introduced as solid component of the polymeric binder, 0, 30, 50, 100 and 300 parts based on 100 parts of the fiber, and changing the fiber to polyester (3.0 denier) in preparing five kinds of composites. On the other hand, as comparative examples, before uniting the layer of the polymer composition with the fibrous sheet material, said material was immersed in the polymer impregnating composition, dried, treated with a mixed solution of DMF and water used in Example 4 and united with the layer of the polymer composition in preparing composites.

One example of various properties of the resulting composites was as shown in Table 5. In the cases of this invention, the amount of the polymeric binder introduced could be freely varied and composites achieving the object of this invention were obtained. The method of preparation of this invention is a method having the great merit of being able to be utilized for multi-uses.

Example 31 (and Comparative Examples M, N)

According to the following three methods, composites were prepared and one example of various properties of the resulting composites, are shown in Table 6.

1. Example 31—the same conditions and the same method as Example 3.

2. Comparative Example M—the aforesaid adhering method.

Material the same as that in Example 3 was used. A non-woven fabric having a thickness of 1.0mm prepared from polyacryl fiber was impregnated with an aqueous emulsion of butyl polyacrylate and dried to prepare a fibrous substrate. On the other hand, a polymer coating composition was coated under the same conditions and by the same method as in Example 3, which was coagulated in a water bath, extracted of solvent and dried to obtain a coating. Next, on one surface of this coating, a DMF solution with 25 percent of polyurethane used in Example 3 was coated as adhesive agent, over which the fibrous substrate was put, dried and caused to adhere to obtain a composite.

3. Comparative Example N—the direct coating method.

Material the same as that in Example 3 was used. A non-woven fabric having a thickness of 1.0mm prepared from polyacryl fiber was impregnated with an aqueous emulsion of butyl polyacrylate, on which a polymer composition was coated under the same conditions and by the same method as in Example 3, and thereafter coagulated and extracted of the solvent in a water bath and dried to obtain a composite.

Table 5

The amount of the polymeric binder introduced, and various properties of the composite

|  | Ex*-26 | Ex-27 | Ex-28 | Ex-29 | Ex-30 | CE*-I | CE-J | CE-K | CE-L |
|---|---|---|---|---|---|---|---|---|---|
| Amount of polymeric binder *1 | 0 | 30 | 50 | 100 | 300 | 30 | 50 | 100 | 300 |
| Thickness of boundary layer (mm) | 0.060 | 0.060 | 0.058 | 0.055 | 0.041 | | | | |
| Pore uniformity | Excellent | Excellent | Excellent | Excellent | Excellent | Poor | Poor | Very poor | Very poor |
| Flexibility resistance ($\times 10^4$ times) | 68 | 60 | 57 | 50 | 30 | 11 | 8 | 3 | 1 |
| Scuff resistance (g) | 1800 | 2000 | 1900 | 1900 | 1800 | 800 | 700 | 200 | 200 |
| Water vapor permeability (mg/cm$^2$hr) | 13.0 | 13.5 | 13.2 | 13.4 | 13.0 | 15.0 | 16.0 | 16.2 | 16.0 |
| Softness (mg) | 1600 | 1750 | 1890 | 2950 | 3700 | | | | |
| Hand characteristics | Excellent | Excellent | Excellent | Excellent | Excellent | Fair | Poor | Poor | Very poor |
| Unevenness on lasting | Excellent | Excellent | Excellent | Excellent | Excellent | Poor | Fair | Fair | Fair |

NOTE:
Ex* = Example
CE* = Comparative Example
*1 Amount (part) as solid of the polymeric binder based on 100 parts of the fiber in case of examples (method of introducing the polymeric binder by coating). Amount (part) as solid of the polymer impregnating composition based on 100 parts of the fiber in case of comparative examples (method of immersing in the impregnating composition).

Table 6

Comparison of various properties of composites obtained by the method of this invention and the conventional method

|  | Ex*-31 | CE*-M | CE-N |
| --- | --- | --- | --- |
| Water vapor permeability (mg/cm$^2$·hr) | 14.0 | 1.5 | 13.0 |
| Softness (mg) | 1730 | 3520 | 2860 |
| Flexibility resistance (×10$^4$ times) | 70 | 15 | 8 |
| Pore uniformity of coating | Excellent | Excellent | Poor |
| Adhesive strength | Excellent | Excellent | Excellent |
| Smoothness of surface coating | Excellent | Excellent | Poor |
| Hand characteristics | Excellent | Fair | Poor |
| Unevenness on lasting | Excellent | Fair | Poor |

NOTE:
Ex* = Example
CE* = Comparative Example

Example 32

Example 3 was repeated except for changing the non-woven fabric to a non-woven fabric having a thickness of 1.2 mm in preparing a composite, said non-woven fabric consisting of ultra fine fiber bundles, each fiber (polyamide) having a denier of 0.1 and a number of 20.

The resulting composite was especially excellent in softness, hand characteristics and flexibility resistance and more like natural leather as compared with the case in which ordinary denier fiber was used.

Example 33

Example 4 was repeated except for using cotton flannel having a thickness of 0.65 mm instead of the non-woven fabric in preparing a composite. The resulting composite was suitable for upholstery, upper leather for ladies' shoes and sandals.

Example 34

A non-woven fabric having a thickness of 0.90 mm was prepared from 2.5 denier polyamide fiber. After this non-woven fabric was heat-pressed, it was immersed in a mixed solution consisting of 70 percent of DMF and 30 percent of water, and then squeezed so that this mixed solution was contained in an amount of 130 parts based on 100 parts of the fiber to obtain a non-woven fabric treated with the mixed solution.

On the other hand, polyethylene adipate (average molecular weight 1,500) was blended with polycaprolactone (average molecular weight 2,000) at a molar ratio of 30:70, the resultant blend was reacted in DMF with diphenylmethane-4, 4'-diisocyanate and 4, 4'-diaminodiphenylmethane to synthesize a DMF solution with 25 percent of polyurethane solution, the following compositions (A) and (B) were prepared.

Composition (A) was prepared the same as in Example 1. The concentration was 23 percent and the viscosity was 2,450 poises. No inorganic compound referred to in this invention was present in this composition. The composition (B) was prepared by so blending aluminum oxide (mean particle diameter 1.2 microns) with said composition (A) that its amount was 155 parts based on 100 parts of polyurethane. The concentration was 35 percent and the viscosity was 1,350 poises.

The composition (A) was coated on a NBR rubber sheet at a thickness of 0.5 mm, on top of which the composition (B) was coated at a thickness of 1.3 mm, on top of which said non-woven fabric treated with the mixed solution was placed, and thereafter the laminated compositions (A), (B) were united with the non-woven fabric by the method and under conditions the same as those in Example 3. Subsequently, from the surface of the non-woven fabric, a DMF solution with 10 percent of polyurethane (viscosity 8 poises) blended with carbon black was introduced and dried at 100° C for 10 minutes. The amount of this polymeric binder adhered as solid was 15 parts based on 100 parts of the fiber.

The resulting composite was then subjected to finish-processing. The DMF solution with 25 percent of polyurethane was combined with carbon black and a DMF/toluene (3/1) mixture to prepare a composition (C) having a concentration of 5 percent and a viscosity of 1 poise. This composition (C) was so coated on the coating surface of the composite that the coating thickness was 8 microns, and dried at 100° C for 1 minute.

Further, a DMF/toluene (3/1) mixture was added to the DMF solution with 25 percent of polyurethane to prepare a transparent composition (D) having a concentration of 2 percent and a viscosity of 0.5 poise. This composition (D) was so coated on the coating obtained from composition (C); the coating thickness was 1 micron, and dried at 100° C for 0.5 minute.

In the resulting structure the porous coating obtained from composition (B), the porous coating obtained from composition (A), the colored non-porous coating obtained from the composition (C) and the transparent non-porous coating obtained from composition (D) were united sequentially on the fibrous substrate.

By subjecting the resulting composite to the aforesaid finish-processing, the creases formed in the leather were just the same as those of German Box Calf, which is the highest grade natural leather. Moreover, the scuff resistance, softness, water vapor permeability, flexibility resistance and scratch resistance were superior to those of the products of Examples 1–33. This was an especially excellent material as upper leather. When this was subjected to embossing, it showed a novel crease formation in which the creases originated of themselves were joined or mixed with creases which originated from the embossing.

The following is claimed:

1. Synthetic leather comprising a fibrous sheet layer and a coating layer, characterized in that
   A. said coating layer consists of a colored non-porous coating layer and a porous coating layer, said colored non-porous coating layer having a thickness of from about 0.005 mm to about 0.05 mm and said porous coating layer having a thickness of from about 0.05 mm to about 1.5 mm;
   B. said fibrous sheet layer consisting of
      a. a boundary layer consisting of a fibrous sheet and a polymer having a porous structure united continuously with said coating layer, said boundary layer being substantially free of a polymeric binder and having a thickness of about 0.01 mm to about 0.2 mm, and
      b. a fibrous substrate layer consisting of a fibrous sheet and said polymeric binder, being substantially free of said boundary layer in the direction of the thickness of about 0.5 mm to about 1.8 mm, and
   C. said synthetic leather having a flexibility resistance which is at least about 10×10$^4$ times, a water vapor permeability of at least about 5 mg/cm$^2$·hr and a scuff resistance of at least about 500 grams.

2. Synthetic leather according to claim 1, wherein the polymer contained in said polymeric binder is selected from the group consisting of polyurethane, polyurethane urea, homopolymers and copolymers composed of vinyl chloride, vinyl acetate, acrylic acid, alkyl-acrylate, methacrylic acid, alkyl-methacrylate, and natural and synthetic rubber.

3. Synthetic leather according to claim 1, wherein the polyurethane or polyurethane urea contained in said polymeric binder is the reaction product of a polymer diol, organic di-isocyanate and low molecular diol or diamine, wherein the polymer diol is selected from the group consisting of polytetramethylene ether glycol, polycaprolactone diol and the hydroxy-terminated reaction product of polytetramethylene ether glycol, dibasic acid or acid anhydride and glycol.

4. Synthetic leather according to claim 1, wherein the polymer contained in the porous structure of said coating layer and boundary layer is selected from the group consisting of polyurethane and polyurethane urea.

5. Synthetic leather according to claim 1, wherein the polyurethane or polyurethane urea contained in said coating layer and boundary layer is the reaction product of a polymer diol, organic di-isocyanate and low molecular diol or diamine, wherein the polymer diol is selected from the group consisting of polytetramethylene ether glycol, polycaprolactone diol and the hydroxy-terminated reaction product composed of polytetramethylene ether glycol, dibasic acid or acid anhydride and glycol.

6. Synthetic leather according to claim 1, wherein a non-porous coating layer consisting of polyurethane having a thickness of from about 0.5 micron to about 30 microns is further applied on said coating layer.

7. Synthetic leather according to claim 6, wherein a transparent non-porous coating layer consisting of polyurethane having thickness of from about 0.5 microns to about 3 microns is further applied on said non-porous coating layer.

8. Synthetic leather according to claim 1, wherein said fibrous sheet layer is ligated three dimentionally with ultra fine fiber bundles, each fiber having a denier of about 0.01 denier to about 0.8 denier.

9. Synthetic leather according to claim 8, wherein said ultra fine fiber bundles contain about 3–25 fibers per bundle.

10. Synthetic leather according to claim 1, wherein the thickness of said coating layer ranges from about 0.15 mm to about 1.0 mm, the thickness of said boundary layer ranges from about 0.03 mm to about 0.18 and the thickness of said fibrous substrate layer ranges from about 0.8 mm to about 1.5 mm.

11. Synthetic leather according to claim 1, wherein the fabric is a non-woven fabric composed of fiber selected from the group consisting of polyamide, polyester and polyacrylonitril.

12. In a method of preparing synthetic leather having a flexibility resistance of at least 10×10$^4$ times, a water vapor permeability of at least 5 mg/cm$^2$·hr and a scuff resistance of at least 500 grams, consisting of a polymer and a fibrous non-woven fabric, the steps which comprise A. pre-treating a fibrous sheet material with a mixture consisting of a solvent and a non-solvent for the polymer coating composition at a weight ratio ranging from about 90/10 to about 65/35, B. applying the polymer coating solution or dispersion to a support, lapping the resulting coating over the pre-treated fibrous sheet material obtained in step (A), uniting the overlapped pair by passing them between at least two rolls having a clearance conforming to the following expression:

$$0.5(X+Y) \leqq \text{clearance} < 1.0(X+Y)$$

(wherein $X$ is the coat thickness of the polymer coating solution or dispersion and $Y$ is the thickness of the fibrous sheet material), and thereafter coagulating said polymer coating solution or dispersion to unite the fabric with the resulting porous coating layer, C. stripping off said support, D. introducing a solution or dispersion of the polymeric binder to the surface, opposite to the coating surface of the fibrous sheet material, E. coagulating said solution or dispersion of polymeric binder, F. coating the solution or dispersion of polymeric material on top of said porous coating layer, and G. heating the substrate to form a non-porous coating layer having a thickness from about 0.005 mm to about 0.05 mm.

13. Method of preparing synthetic leather according to claim 12, wherein the polymer contained in said binding polymer solution or dispersion is selected from the group consisting of polyurethane, polyurethane urea; homopolymers or copolymer composed of vinyl chloride, vinyl acetate, acrylic acid, alkyl-acrylate, methacrylic acid, alkyl-methacrylate; natural or synthetic rubber.

14. Method of preparing synthetic leather according to claim 12, wherein the polymer contained in said coating polymer solution or dispersion is selected from the group consisting of polyurethane and polyurethane urea.

15. Method of preparing synthetic leather according to claim 12, wherein the polyurethane or polyurethane urea contained in said binding polymer solution or dispersion is the reaction product of a polymer diol, organic di-isocyanate and low molecular diol or diamine, wherein the polymer diol is selected from the group consisting of polytetramethylene ether glycol, polycaprolactone diol and the hydroxy-terminated reaction product composed of polytetramethylene ether glycol, dibasic acid or acid anhydride and glycol.

16. Method of preparing synthetic leather according to claim 12, wherein the polyurethane or polyurethane urea contained in said coating polymer solution or dispersion is the reaction product of a polymer diol, organic di-isocyanate and low molecular diol or diamine, wherein the polymer diol is selected from the group consisting of polytetramethylene ether glycol, polycaprolactone diol and hydroxy-terminated reaction product composed of polytetramethylene ether glycol, dibasic acid or acid anhydride and glycol.

17. Method of preparing synthetic leather according to claim 12, wherein the solvent contained in said binding polymer solution is N,N-dimethyl formamide.

18. Method of preparing synthetic leather according to claim 12, wherein the solvent contained in said coating polymer solution is N,N-dimethyl formamide.

19. Method of preparing synthetic leather according to claim 12, wherein the concentration of said polymer coating solution ranges from about 10 to about 50 percent, and the viscosity of said solution ranges from about 200 poises to about 8,000 poises at 20° C.

20. Method of preparing synthetic leather according to claim 12, wherein the concentration of the solution of said polymeric binder ranges from about 3 to about 5 percent and the viscosity of said solution ranges from about 0.5 poises to about 300 poises.

21. Method of preparing synthetic leather according to claim 12, wherein the polymer contained in said polymer dispersion is selected from the group consisting of polyurethane, polyurethane urea, homopolymers or copolymer composed of acrylic acid, alkyl-acrylate, and natural or synthetic rubber, wherein said polymer is dispersed about 5 wt. percent from 60 wt. percent in a liquid which does not dissolve said polymer contained in the polymer coating composition and fabric.

22. Method of preparing synthetic leather according to claim 12, wherein the solvent for said polymer coating composition in step (a) is N,N-dimethyl formamide, and the non-solvent for said polymer coating composition in step (a) is water.

23. Method of preparing synthetic leather according to claim 12, wherein said coagulation is carried out in a liquid which does not dissolve said fiber and said polymer, but is miscible with said polymer solvent.

24. Method of preparing synthetic leather according to claim 12, wherein said coagulation is carried out at about 5°–50° C.

25. Method of preparing synthetic leather according to claim 12, wherein said fibrous sheet material is ligated three dimensionally with ultra fine fiber bundles composed of each fiber having the denier of about from 0.01 to 0.8 and the number of about 3 to 25.

26. Method of preparing synthetic leather according to claim 12, wherein after said step (e), step (f) is practiced which comprises coating the solution or dispersion of polyurethane on top of said coating layer and heating at about 50° to 180° C. the porous coated solution or dispersion to form a non-porous coating layer having a thickness of from about 5 microns to 30 microns.

27. Method of preparing synthetic leather according to claim 25, wherein after said step (f), step (g) is practiced which comprises forming a transparent non-porous coating layer consisting of polyurethane having a thickness of about 1 micron to about 10 microns on top of said non-porous coating layer.

28. Method of preparing synthetic leather according to claim 12, wherein said support is a member selected from the group consisting of polyester film, polyethylene film, silicone sheet and NBR (rubber) sheet.

29. Method of preparing synthetic leather according to claim 12, wherein said step (c) is carried out after said step (d) or (e).

30. A method for preparing synthetic leather according to claim 12, wherein said fabric is prepared by the following steps:
  A. impregnating a primary sheet substance composed of polymers A and B with polymer C wherein said sheet substance comprises numerous adherent fibrous materials each consisting of a plurality of fibrous polymer A extending in a longitudinal direction and contained within a bonding polymer B having a dissolving property in a solvent different from that of said polymer A and wherein said polymer C has a dissolving property in a solvent different from that of said polymers A and B, and
  B. removing said bonding polymer B from the product of step (1) by dissolving off said bonding polymer B with a solvent capable of dissolving only said bonding polymer B but not said polymers A and C to effectively convert said numerous adhered fibrous materials into numerous bundles of said polymer A.

31. Method of preparing synthetic leather according to claim 29, wherein said fibrous polymers A are selected from the group consisting of polyamides and polyethylene terephthalate.

32. Method of preparing synthetic leather according to claim 29, wherein said bonding polymer B consists of polystyrene, styrene acrylonitrile copolymer or styrene acrylic acid copolymer.

33. Method of preparing synthetic leather according to claim 29, wherein said polymer C is a water-soluble polymer selected from the group consisting of polyvinyl alcohol, carboxyethyl cellulose, casein, polyvinyl methylether, starch, polyethylene oxide and sodium polyacrylate.

34. Method of preparing synthetic leather according to claim 29, wherein said polymer C is dissolved off after the solution or dispersion of said polymeric binder is impregnated and coagulated.

\* \* \* \* \*